United States Patent
Feng

(10) Patent No.: US 7,647,507 B1
(45) Date of Patent: Jan. 12, 2010

(54) SECURE DIGITAL CONTENT DISTRIBUTION SYSTEM AND SECURE HARD DRIVE

(75) Inventor: Weishi Feng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1009 days.

(21) Appl. No.: 10/796,599

(22) Filed: Mar. 9, 2004

Related U.S. Application Data

(60) Provisional application No. 60/485,578, filed on Jul. 8, 2003, provisional application No. 60/489,361, filed on Jul. 23, 2003.

(51) Int. Cl.
*G06F 21/00* (2006.01)
(52) U.S. Cl. ................................ 713/193; 380/277
(58) Field of Classification Search .............. 381/281, 381/277; 713/193
See application file for complete search history.

(56) References Cited

U.S. PATENT DOCUMENTS

| | | | | |
|---|---|---|---|---|
| 5,999,629 A | * | 12/1999 | Heer et al. ............... | 705/51 |
| 6,438,235 B2 | * | 8/2002 | Sims, III ............... | 380/285 |
| 6,550,011 B1 | * | 4/2003 | Sims, III ............... | 713/193 |
| 6,683,954 B1 | * | 1/2004 | Searle .................. | 380/30 |
| 7,380,135 B2 | * | 5/2008 | Nishimoto et al. ....... | 713/193 |
| 2003/0195891 A1 | * | 10/2003 | Marsh .................. | 707/100 |
| 2004/0034785 A1 | * | 2/2004 | Tai et al. ............. | 713/189 |

* cited by examiner

*Primary Examiner*—Gilberto Barron, Jr.

(57) ABSTRACT

A secure hard drive comprises a storage medium that stores encrypted digital content and corresponding encrypted content keys. A public key decryption module receives one of the encrypted content keys from the storage medium and decrypts the encrypted content key using a private key to generate a content key. A block decryption module receives the encrypted digital content corresponding to the one of the encrypted content keys from the storage medium and the content key from the public key decryption module and decrypts the encrypted content using the content key. The storage medium is a magnetic storage medium. The public key decryption module and the block decryption module are implemented by a system on chip (SOC). A content player receives the decrypted digital content from the block decryption module and generates at least one of an analog output signal and a digital output signal.

86 Claims, 7 Drawing Sheets

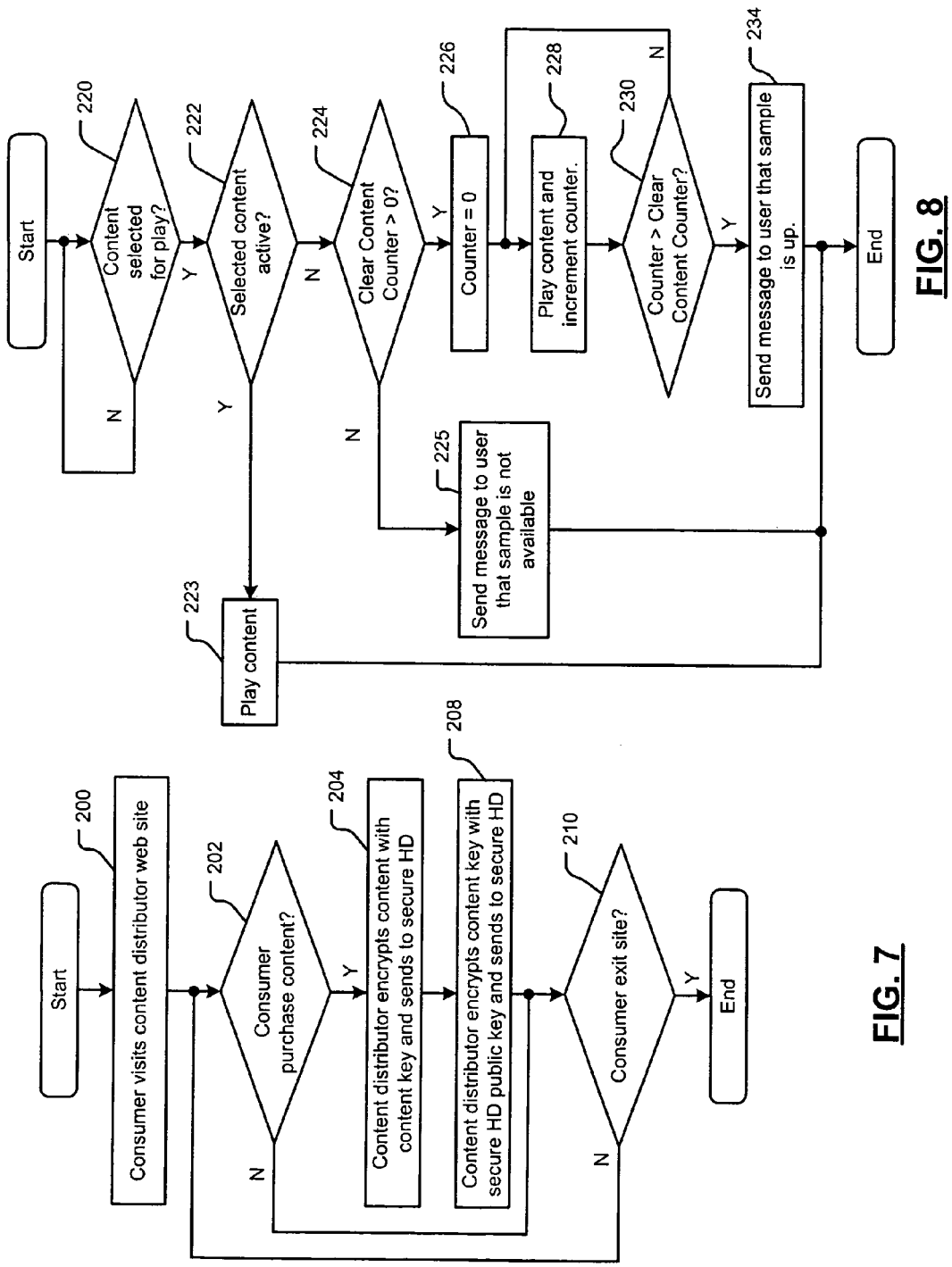

SECURE DIGITAL CONTENT DISTRIBUTION SYSTEM AND SECURE HARD DRIVE

CROSS-REFERENCE TO RELATED APPLICATIONS

This application claims the benefit of U.S. Provisional Application No. 60/485,578, filed on Jul. 8, 2003 and U.S. Provisional Application No. 60/489,361, filed on Jul. 23, 2003, both of which are incorporated herein by reference in their entirety.

FIELD OF THE INVENTION

The present invention relates to the distribution of digital content such as audio, video, music, still pictures and the like, and more particularly to secure content distribution systems and secure hard drives.

BACKGROUND OF THE INVENTION

Digital content such as but not limited to computer software, still pictures, audio, music, and video is typically distributed using digital video (or versatile) discs (DVDs), compact discs (CDs), floppy disks, and/or via the Internet. Content providers have had a difficult time preventing piracy of their content. Typically, users store the digital content using hard drives, CDs, DVDs, floppy disks or other electronic storage media. The losses that can be attributed to piracy are well in excess of billions of dollars annually and growing at an alarming pace. Because the medium and the drive are separable, it is very difficult to defeat bit-by-bit copies of the digital content. For example, pirates of DVDs used bit-by-bit copying before the DVD encryption scheme was cracked.

SUMMARY OF THE INVENTION

A secure hard drive according to the present invention comprises a storage medium that stores encrypted digital content and corresponding encrypted content keys. A public key decryption module receives one of the encrypted content keys from the storage medium and decrypts the encrypted content key using a private key to generate a content key. A block decryption module receives the encrypted digital content corresponding to the one of the encrypted content keys from the storage medium and the content key from the public key decryption module and decrypts the encrypted content using the content key.

In other features, the storage medium is a magnetic storage medium. The public key decryption module and the block decryption module are implemented by a system on chip (SOC). A content player receives the decrypted digital content from the block decryption module and generates at least one of an analog output signal and a digital output signal. An identification (ID) module provides an ID. The private key and a public key are based on the ID. A controller performs buffer management and timing of read/write operations.

A system comprises the secure hard drive and further comprises an external host and a control interface that provides an interface between the controller and the external host. The external host is one of a computer and a portable media player.

In yet other features, a watermark detector communicates with an output of the content player and determines whether the analog signal that is output by the content player contains a watermark. The storage medium stores a content directory having content directory entries for the content. The public key decryption module performs digital signature verification of the content directory entry corresponding to the content that is selected for play.

In other features, at least one of the content directory entries contains a clear content counter that specifies a portion of the corresponding content that is not encrypted. A content distributor identification (ID) field that identifies a content distributor supplying the corresponding content. A content status field that has one of an active status and a passive status. The active status enables playback and the inactive status disables playback. A signature field for the content distributor supplying the corresponding content. A content key location field that contains a first offset value points to a content key for the selected content in a content key block stored on the storage medium. A content location field that contains a second offset value that points to the selected content in an encrypted content block stored on the storage medium.

In still other features, the content includes at least one of audio, video, and still pictures. The system comprises a distributed communications network and at least one content distributor that transmits encrypted content, an encrypted content key, and a content directory entry for a content selection to the secure hard drive via the external host and the distributed communications network. The storage medium contains encrypted content that is pre-stored thereon.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a flowchart illustrating steps for downloading encrypted digital content from a content distributor;

FIG. 8 is a flowchart illustrating steps for allowing users to sample portions of inactive content.

DETAILED DESCRIPTION OF THE PREFERRED EMBODIMENTS

Figure 1:
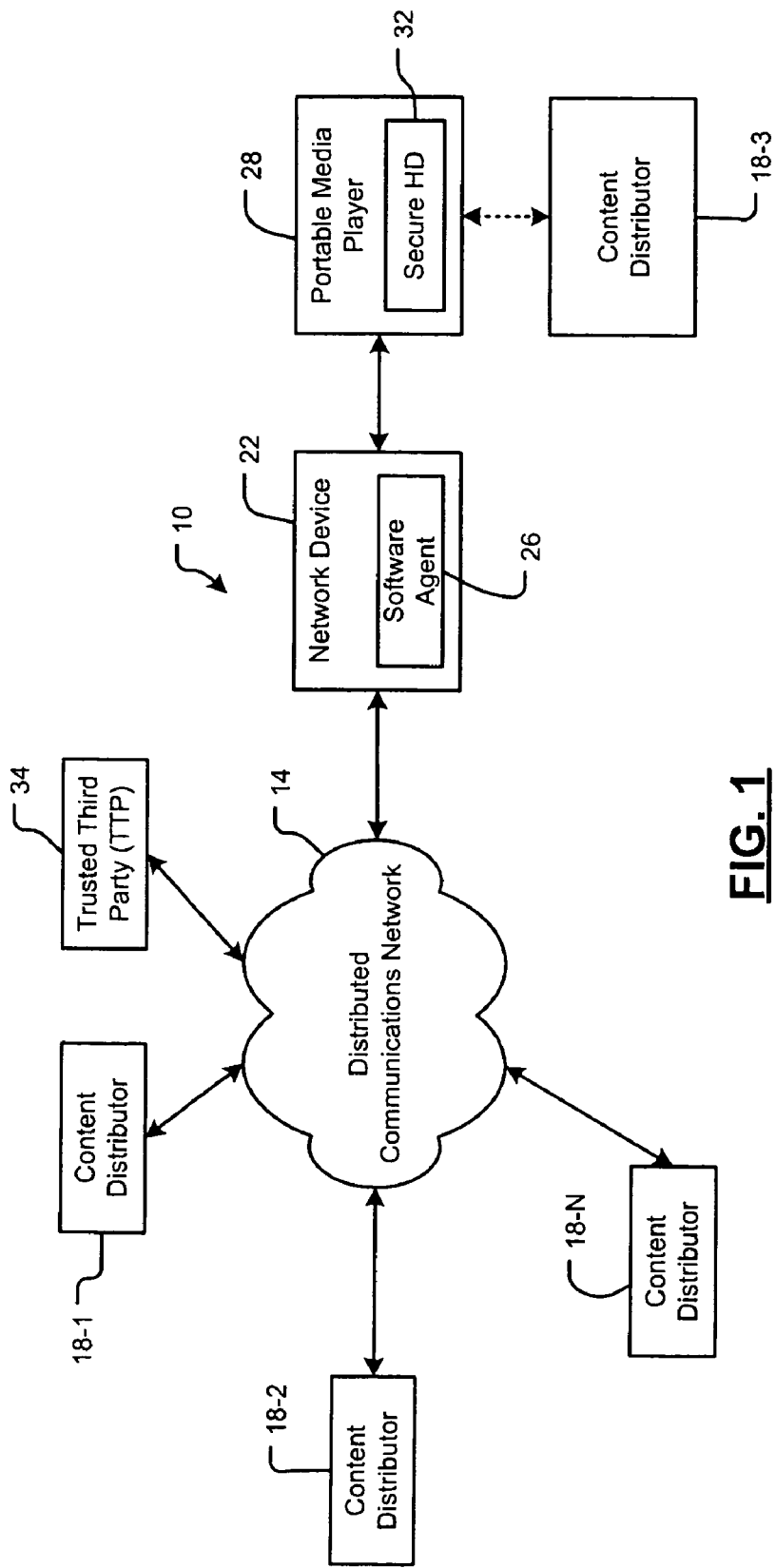
FIG. 1 is a functional block diagram of a secure distribution system for digital content according to the present invention.

The following description of the preferred embodiment(s) is merely exemplary in nature and is in no way intended to limit the invention, its application, or uses. For purposes of clarity, the same reference numbers will be used in the drawings to identify the same elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

The secure content distribution system according to the present invention integrates the content storage medium with the drive. Since the manufacture of hard drives is a highly specialized industry, a high level of security is provided through this integration. The present invention allows distribution of a secure personal content library with a low risk of loss of the digital content to piracy.

Referring now to FIG. 1, a secure content distribution system 10 according to the present invention is shown. The secure content distribution system 10 includes a distributed communications system 14 such as the Internet, a Bluetooth network, a local area network (LAN), a wide area network (WAN), a cellular network, a satellite network or other suitable network. One or more content distributors 18-1, 18-2, . . . , and 18-N (collectively content distributors 18) distribute secure digital content such as a software, video, audio, still pictures, music and the like over the distributed communications system 14.

A network device 22 such as a personal computer, portable media players such as personal digital assistants (PDA), cellular phones, MP3 players, and/or other any other device communicates either wirelessly and/or directly with the content distributors 18 over the distributed communications system 14. The network device facilitates a connection to the content distributors 18. The network device 22 is removably connected to a portable media player 28 that includes a secure hard drive 32. The network device 22 includes a software agent 26 such as a browser that negotiates a link with the content distributor 18 and manages the transfer of data to the secure hard drive 32. The portable media players can also directly connect to the distributed communications system 14. A trusted third party (TTP) distributes and authenticates public keys for the secure hard drives 32 and the content distributors 18. The content distributor 18-3 may also pre-store digital content on the secure hard drive 32 with either an active status (can be played) or inactive status (cannot be played), as will be described further below.

Figure 2:
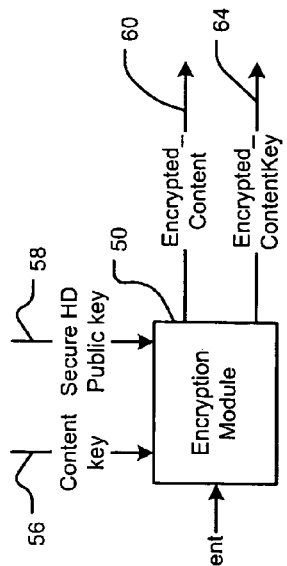
FIG. 2 is a functional block diagram illustrating encryption of the digital content and the content key by the content distributor.

Referring now to FIG. 2, when a consumer visits a web site of the content distributor 18, the consumer may wish to purchase content. The content distributor 18 uses an encryption module 50 that encrypts content 54 using a content key 56. The content key 56 is preferably a randomly selected key, although other methods for determining content keys may be used. The content key 56 is then encrypted using a public key 58 of the secure hard drive 32 that requests the content 54. The consumer downloads encrypted content 60 and an encrypted content key 64 over the distributed communications system 14 onto the secure hard drive 32.

Figure 3A:
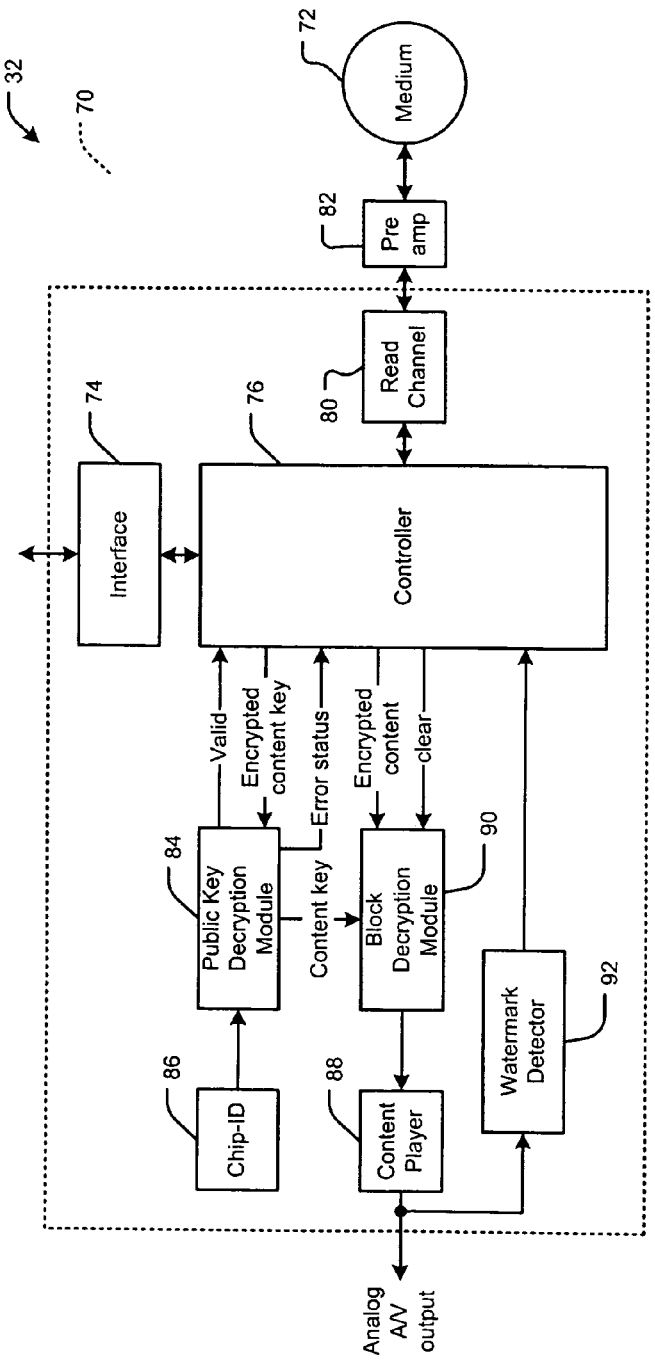
FIG. 3A is a functional block diagram of a secure hard drive that includes a system on chip (SOC) according to the present invention.

Referring now to FIG. 3A, the secure hard drive 32 is shown in further detail and includes a SOC 70 and a magnetic medium 72, which stores the encrypted content 60 and the encrypted content keys 64. While the SOC 70 is shown, components of the SOC 70 can be implemented as discrete components. As will be described below, only the SOC on the secure hard drive 32 can recover the content key 56. The SOC 70 includes a control interface 74 that provides an external interface to a host and/or network device. The control interface 74 communicates with a controller 76, which performs buffer management, times read/write events and performs other hard drive operations. The controller 76 may include one or more of the following components: a central processing unit (CPU), memory, a hard drive controller (HDC), a buffer manager, firmware, a universal serial bus (USB), and/or other components.

The controller 76 communicates with a read channel circuit 80 and a preamplifier 82, which recover the data from the read signal that is generated by the read/write head as it passes over the magnetic medium 72. The read signal is processed by the read channel 80 and the controller 76 to generate digital data signals. Some of the digital data signals include the encrypted content key 64, which is output to a public key decryption module 84. A chip ID module 86 outputs a chip ID to the public key decryption module 84. The SOC 70 has a unique chip ID, which is used to generate a private key for the SOC 70. The private key, in turn, is used to generate a public key for the SOC 70. For example, the public key decryption module 80 may contains a sub-module that converts the Chip-ID to the private key. Various algorithms may be used to generate the private key.

The public key decryption module 84 uses the private key of the SOC 70 to decrypt the encrypted content key 64 and outputs the content key 56 to a block decryption module 90. The controller 76 outputs the encrypted content 60 to the block decryption module 90, which uses the content key 56 to decrypt the encrypted content 60. The block decryption module 90 outputs the content to a content player 88, which generates an analog and/or digital output signal that includes at least one of audio, video, still pictures, and the like.

The SOC 70 may optionally include a watermark detector 92 that determines whether the analog signal that is output by the content player 88 includes a watermark. The watermark includes copy control information embedded in the analog signal. In other words, the watermark detector 92 is used to defeat analog attacks such as capture and re-coding.

Figure 3B:
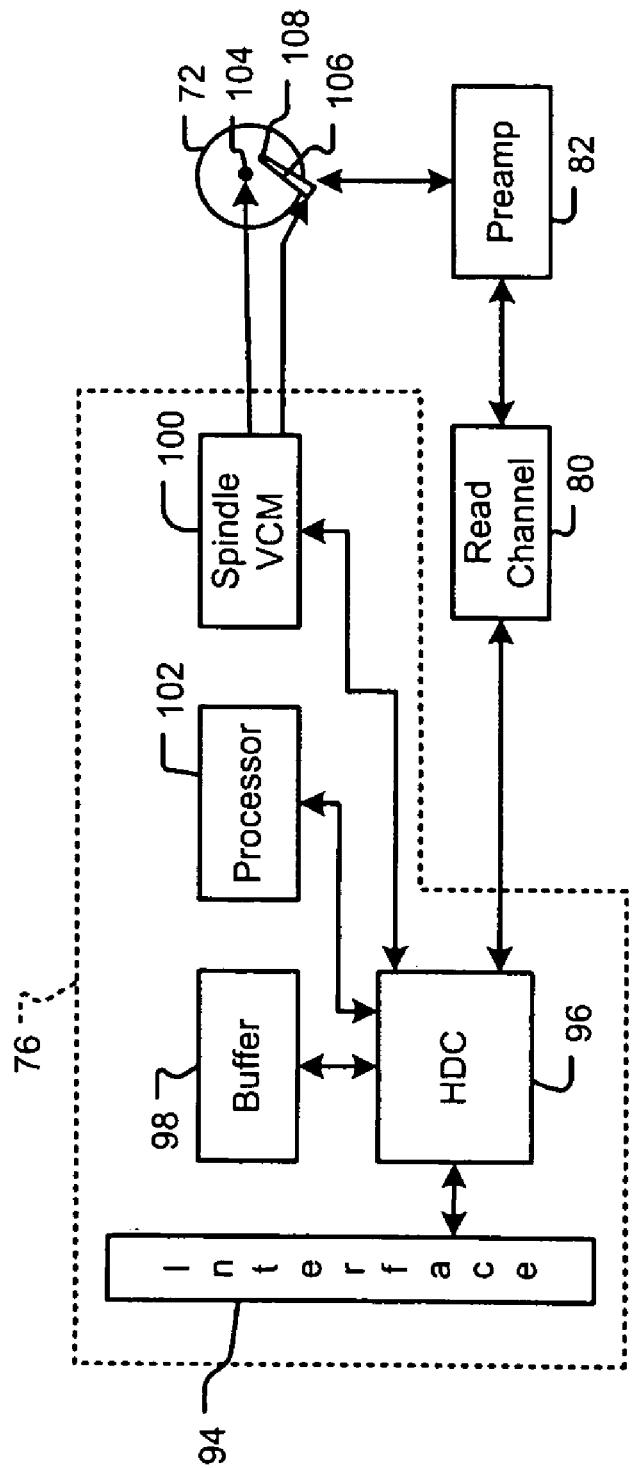
FIG. 3B is a functional block diagram that illustrates one implementation of a controller of FIG. 3A.

Referring now to FIG. 3B, one implementation of the controller 76 is shown to include a serial and/or parallel interface 94 such as but not limited to serial ATA and/or Integrated Device Electronics (IDE), a hard disk controller (HDC) 96, a buffer 98, a spindle voice coil module (VCM) 100, and a processor 102. The spindle VCM 100, which interfaces with the HDC 96 and a spindle motor 104, controllably rotates the magnetic medium 72. The spindle VCM 100 also interfaces with a read/write arm 106 that is used to position a magneto-resistive (MR) head 108. A resistance of the MR head 108 varies as it passes in proximity to stored positive and negative magnetic fields on the magnetic medium 72, which represent digital ones and zeros. The buffer 98 stores data that is associated with read/write operations and other control functions of the controller 76. The processor 102 performs processing that is associated with the read/write operations and other functions of the controller 76. While a specific implementation is shown for the controller 76, skilled artisans will appreciate that there are other suitable controller configurations that are contemplated.

Figure 4:
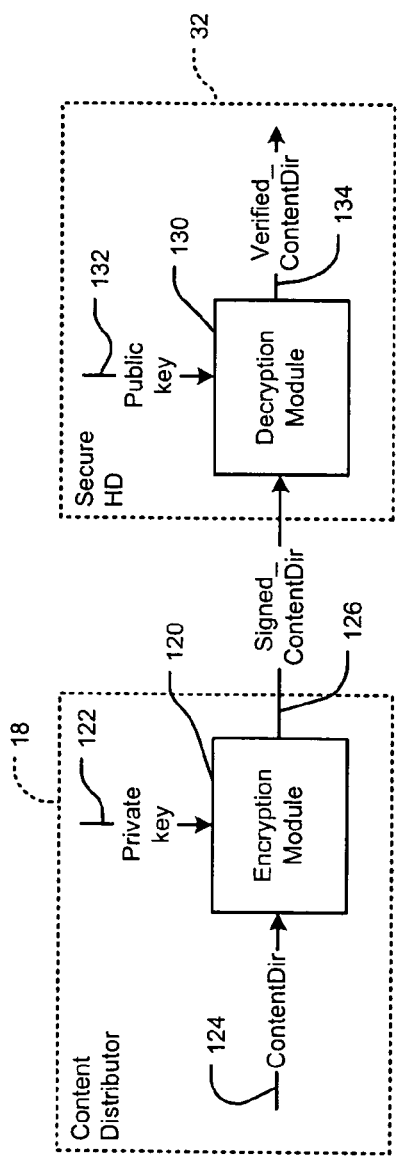
FIG. 4 is a functional block diagram of an exemplary implementation for signing a content directory and/or content directory entry.

Referring now to FIG. 4, processing of the content directory is shown in further detail. The content distributor 18 creates a content directory and/or a content directory entry for the selected content. The content directory entry may include data such as but not limited to the title, artist, and status (active (can be played) and inactive (cannot be played)). The content directory is preferably protected by a digital signature of the content distributor 18 so that others cannot modify the fields that are stored in the content directory.

The content distributor 18 may use an encryption module 120 and a private key 122 to sign the content directory and/or the content directory entry. A signed content directory 126 is transmitted over the distributed communications system 14 or otherwise input to the secure hard drive 32. For example, one implementation where the distributed communications system 14 is not used includes a secure hard drive 32 with pre-recorded content. The pre-recorded content may be inactive (cannot be played) or active (can be played).

The secure hard drive 32 includes a decryption module 130, which uses the public key 132 of the content distributor 18 to generate a verified content directory 134 from the signed content directory 126. While others may view the signed content directory 126, they are unable to modify it. While this is an effective method for securing the content directory 124, the signed content directory 126 is typically at least twice the size of the content directory 124.

Figure 5:
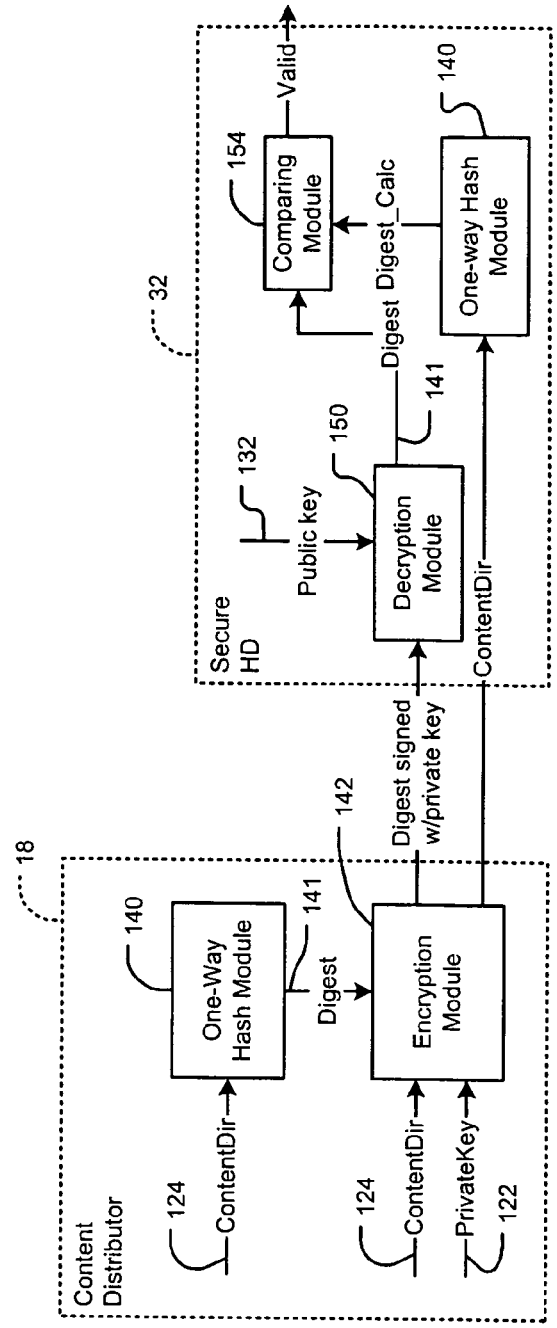
FIG. 5 is a functional block diagram of an alternate implementation for signing a content directory and/or content directory entry.

An alternate implementation for signing the content directory 124 is shown in FIG. 5. A one-way hash module 140 uses a hash function to generate a digest 141 from the content directory 124. The digest is then signed with a private key of the content distributor 18 in an encryption module 142. The plaintext content directory 124 is also transmitted or otherwise loaded on the secure hard drive 32. The secure hard drive 32 includes a decryption module 150 that uses the public key of the content distributor 18 to recover the digest 141. The secure hard drive 32 also includes a one-way hash module 140 that generates a calculated digest. The two digests (the recovered digest and the hash-generated digest) are compared by a comparing module 154, which generates a valid digest signal if they match and an invalid digest signal if they do not. Both the secure hard drive 32 and the content distributor 18 preferably maintain a copy of the content directory. If the secure hard drive 32 fails, all of the digital content that is owned by the consumer can be replaced after proper verification.

Figure 6:
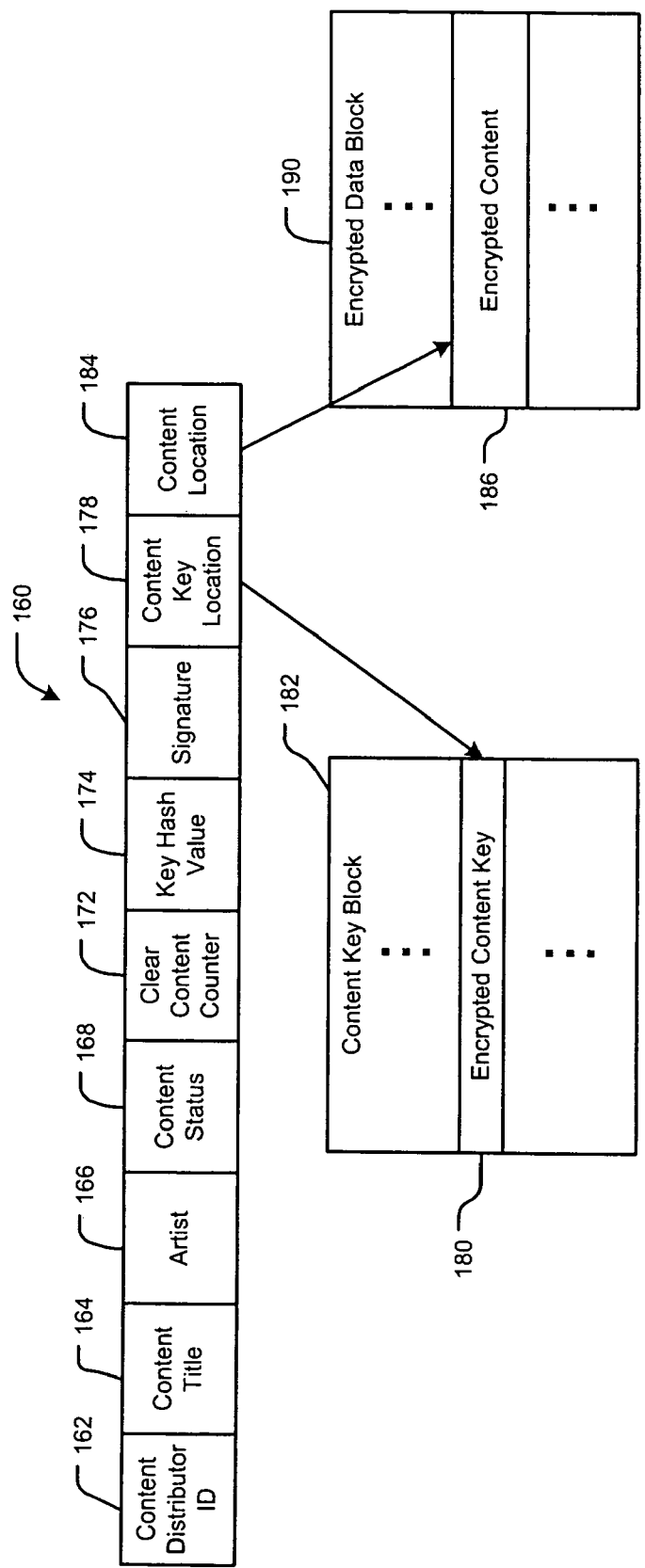
FIG. 6 illustrates exemplary fields of a content directory entry.

Referring now to FIG. 6, an exemplary content directory entry 160 is shown. Skilled artisans will appreciate that the content directory will contain an entry for each content selection. The content directory entry 160 includes a content distributor identification (ID) field 162 that identifies the content distributor 18. Content title and artist fields 164 and 166 describe the title of the content and name of the artist, respectively. A content status field 168 identifies whether the content is active or inactive. A clear content counter 172 specifies a predetermined portion (bits, bytes, segments and/or any other measure) at the beginning of the digital content that is not encrypted. The clear content counter 172 is specified by the content distributor 18.

A key hash value field 174 contains a hash value. The encrypted content key can be hashed and the hash value can be protected by the content distributor's signature. The key hash value is used to defeat a possible hacker. For example, without this field, a hacker can purchase one content selection (active) and have other inactive content selections. The hacker could play the inactive content selections by replacing the content location and the content key location fields in the inactive content directory entries with the content location and content key location of the active content selection. A secure hard drive without the hash field may allow this to occur. If the key hash value field is used, this approach will be prevented.

A content distributor's signature field 176 contains the signature of the content distributor, which can be verified using the content distributor's public key. The content key location field 178 contains an offset value that points to a selected content key 180 in a content key data block 182. A content location field 184 contains an offset value that points to encrypted content 186 in an encrypted data block 190. The fields 178 and 184 will typically be determined by the secure hard drive 32 rather than the content distributor 18.

Referring now to FIG. 7, typical steps that are implemented by the content distributor 18 for secure content distribution according to the present invention are shown. A consumer visits a website of the content distributor 18 in step 200. In step 202, the content distributor 18 determines whether the consumer purchases content. If step 202 is true, the content distributor 18 encrypts the selected digital content with the random content key and sends the encrypted content to the secure hard drive 32 in step 204.

In step 208, the content distributor 18 encrypts the content key with the public key of the secure hard drive 32 and sends the encrypted content key to the secure hard drive 32. As can be appreciated, the encrypted content and the encrypted content key can be sent to the purchasing consumer at the same time. The content directory may be signed and sent at this time using the methods described above. In step 210, the content distributor 18 determines whether the consumer exits the website of the content distributor. If yes, control ends. Otherwise, control returns to step 202.

Referring now to FIG. 8, operation of the clear content counter in the secure hard drive 32 is illustrated. In step 220, the secure hard drive 32 determines whether the user selects content for play. If not, control loops back to step 220. Otherwise when the user selects content to be played, the secure hard drive 32 determines whether the content has a content status that is equal to active in step 222. If true, the secure hard drive 32 plays the content in step 223. Otherwise, control determines whether the clear content counter is greater than zero in step 224. If not, control sends a message to the user that the content is not active and that a sample is not available in step 225. If step 224 is true, a counter is set to zero in step 226. In step 228, the content is played and the counter is incremented. In step 230, the secure hard drive 32 determines whether the counter is greater than the clear content counter. If false, control continues with step 228. Otherwise the sample time is over when the counter exceeds the clear content counter. A message is sent to the user that the sample is over in step 234. Additional steps and/or dialogue may be initiated with the user to solicit purchase of the sampled digital content. Steps 225 and 234 may be omitted if desired.

Figure 9:
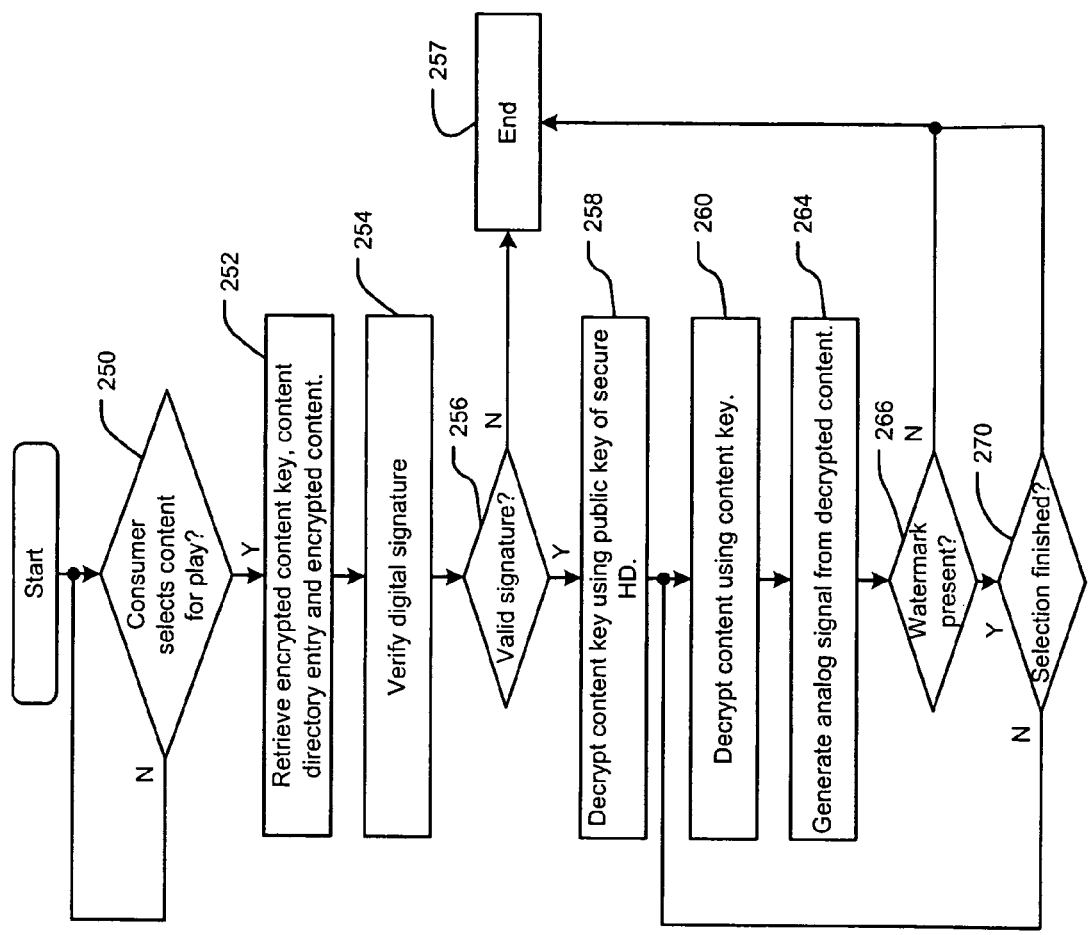
FIG. 9 is a flowchart illustrating steps for playing back digital content stored on the secure hard drive.

Referring now to FIG. 9, steps for playing back content are shown. In step 250, control determines whether the consumer selects content for playback. If not, control loops back to step 250. In step 252, control retrieves the encrypted content key, the content directory entry and the encrypted content that are associated with the selected content. In step 254, the digital signature is verified. In step 256, control determines whether the digital signal is valid. If not, control ends in step 257. Otherwise control continues with step 258 and the content key is decrypted with the private key of the secure hard drive 32. In step 260, the content is decrypted using the decrypted content key. In step 264, an analog signal is generated from the decrypted content and is output to an audio/video playback device. In step 266, control determines whether a watermark is detected (when the optional watermark detector is used). If not, control ends in step 257. Otherwise, control determines whether the selected content is over. If not, control ends in step 257. Otherwise control loops back to step 260.

There are many advantages when content is distributed using the secure hard drive 32 and the secure content distribution system 10 according to the present invention. The content distributors 18 have end-to-end control of the encryption of their digital content. The content key is not revealed to anyone else on the network other than the content distributor 18. On the consumer side, the content key is never revealed outside of the SOC 70. Security is not compromised even if a hacker hacks into the firmware of the secure hard drive 32. The chip-ID is part of a very complicated chip (the SoC). Therefore, it would take a significant amount of effort to determine the chip-ID. Even if the hacker can determine the chip-ID, it is still very difficult to determine the private key from the chip-ID. For example, a keyed-hash function and/or other coding techniques can be used to generate the private key from the chip-ID. Therefore, the system cannot be compromised without breaking the encryption/decryption scheme, which is unlikely.

Those skilled in the art can now appreciate from the foregoing description that the broad teachings of the present invention can be implemented in a variety of forms. For example, while the present invention is described in conjunction with magnetic storage systems, other electronic storage may be used such as memory and/or optical storage. Therefore, while this invention has been described in connection with particular examples thereof, the true scope of the invention should not be so limited since other modifications will become apparent to the skilled practitioner upon a study of the drawings, the specification and the following claims.

What is claimed is:

1. A secure hard drive, comprising:
   a storage medium that stores encrypted digital content and corresponding encrypted content keys;
   a public key decryption module that receives one of said encrypted content keys from said storage medium, and that controls decryption of said encrypted content key for said secure hard drive using a private key to generate a content key; and
   a block decryption module that receives said encrypted digital content corresponding to said one of said encrypted content keys from said storage medium and said content key from said public key decryption module, and that decrypts said encrypted content using said content key,
   wherein said private key is generated based on a chip identification (ID) of the secure hard drive.

2. The secure hard drive of claim 1 wherein said storage medium is a magnetic storage medium.

3. The secure hard drive of claim 1 wherein said public key decryption module and said block decryption module are implemented by a system on chip (SOC).

4. The secure hard drive of claim 1 further comprising:
   a content player that receives said decrypted digital content from said block decryption module, and that generates at least one of an analog output signal and a digital output signal; and
   an ID module that provides said chip ID,
   wherein said public key decryption module generates said private key using said chip ID and then generates said content key based on said private key.

5. The secure hard drive of claim 1 further comprising a controller that performs buffer management and timing of read/write operations.

6. A system comprising the secure hard drive of claim 5 and further comprising:
   an external host; and
   a control interface that provides a communications interface between said controller and said external host.

7. The system of claim 6 wherein said external host is one of a computer and a portable media player.

8. The secure hard drive of claim 4 further comprising a watermark detector that communicates with an output of said content player and that determines whether said analog signal that is output by said content player contains a watermark.

9. The secure hard drive of claim 1 wherein said storage medium stores a content directory having content directory entries for said content.

10. The secure hard drive of claim 9 wherein said public key decryption module performs digital signature verification of said content directory entry corresponding to said content that is selected for play.

11. The secure hard drive of claim 9 wherein at least one of said content directory entries contains a clear content counter that specifies a portion of said corresponding content that is not encrypted.

12. The secure hard drive of claim 9 wherein at least one of said content directory entries includes a content distributor ID field that identifies a content distributor supplying said corresponding content.

13. The secure hard drive of claim 9 wherein at least one of said content directory entries includes a content status field that has one of an active status and a passive status, wherein said active status enables playback and said inactive status disables playback.

14. The secure hard drive of claim 9 wherein at least one of said content directory entries includes a signature field for said content distributor supplying said corresponding content.

15. The secure hard drive of claim 9 wherein at least one of said content directory entries includes a content key location field that contains a first offset value that points to a content key for said selected content in a content key block stored on said storage medium.

16. The secure hard drive of claim 9 wherein at least one of said content directory entries includes a content location field that contains a second offset value that points to said selected content in an encrypted content block stored on said storage medium.

17. The secure hard drive of claim 1 wherein said content includes at least one of audio, video, and still pictures.

18. The system of claim 6 further comprising:
   a distributed communications network; and
   a content distributor that transmits encrypted content, an encrypted content key, and a content directory entry for a content selection to said secure hard drive via said external host and said distributed communications network.

19. The secure hard drive of claim 1 wherein said storage medium contains encrypted content that is pre-stored thereon.

20. A secure hard drive, comprising:
   a magnetic storage medium that stores encrypted digital content and corresponding encrypted content keys;
   a system on chip (SOC) including:
      a public key decryption module that receives one of said encrypted content keys from said magnetic storage medium, and that controls decryption of said encrypted content key for said secure hard drive using a private key of said SOC to generate a content key; and
      a block decryption module that receives said encrypted digital content corresponding to said one of said encrypted content keys from said magnetic storage medium and said content key from said public key decryption module, and that decrypts said encrypted content using said content key,
   wherein said public key decryption module generates said private key based on a chip identification (ID) of the secure hard drive.

21. The secure hard drive of claim 20 further comprising a content player that receives said decrypted digital content from said block decryption module and that generates an analog output signal.

22. The secure hard drive of claim 20 further comprising a chip ID module that provides said chip ID for said SOC, wherein said private key and a public key of said SOC are based on said chip ID.

23. The secure hard drive of claim 20 wherein said SOC further includes a controller that performs buffer management and timing of read/write operations.

24. A system comprising the secure hard drive of claim 23 and further comprising:
an external host; and
a control interface that provides an interface between said controller and said external host.

25. The secure hard drive of claim 21 further comprising a watermark detector that communicates with an output of said content player and that determines whether said analog signal that is output by said content player contains a watermark.

26. The secure hard drive of claim 20 wherein said magnetic storage medium stores a content directory having content directory entries for said content.

27. The secure hard drive of claim 26 wherein said public key decryption module performs digital signature verification of said content directory entry corresponding to said content that is selected for play.

28. The secure hard drive of claim 26 wherein at least one of said content directory entries contains at least one of a clear content counter that specifies a portion of said corresponding content that is not encrypted, a content distributor ID field that identifies a content distributor supplying said corresponding content, a content status field that has one of an active status and a passive status, wherein said active status enables playback and said inactive status disables playback, a signature field for said content distributor supplying said corresponding content, a content key location field that contains a first offset value that points to a content key for said selected content in a content key block stored on said magnetic storage medium, and a content location field that contains a second offset value that points to said selected content in an encrypted content block stored on said magnetic storage medium.

29. The secure hard drive of claim 20 wherein said content includes at least one of audio, video, and still pictures.

30. The system of claim 24 further comprising:
a distributed communications network; and
a content distributor that transmits encrypted content, an encrypted content key, and a content directory entry for a content selection to said secure hard drive via said external host and said distributed communications system.

31. A secure hard drive, comprising:
storing means for storing encrypted digital content and corresponding encrypted content keys;
public key decryption means for receiving one of said encrypted content keys from said storing means, and for controlling decryption of said encrypted content key for said secure hard drive using a private key to generate a content key; and
block decryption means for receiving said encrypted digital content corresponding to said one of said encrypted content keys from said storing means and said content key from said public key decryption means, and for decrypting said encrypted content using said content key,
wherein said private key is generated based on a chip identification (ID) of the secure hard drive.

32. The secure hard drive of claim 31 wherein said storing means includes a magnetic storing medium.

33. The secure hard drive of claim 31 wherein said public key decryption means and said block decryption means are implemented by a system on chip (SOC).

34. The secure hard drive of claim 31 further comprising:
content playing means for receiving said decrypted digital content from said block decryption means, and for generating at least one of an analog output signal and a digital output signal; and
an ID means for providing said chip ID,
wherein said public key decryption means generates said private key using said chip ID and then generates said content key based on said private key.

35. The secure hard drive of claim 31 further comprising controller means for performing buffer management and timing of read/write operations.

36. A system comprising the secure hard drive of claim 35 and further comprising:
an external host; and
control interface means for providing a communications interface between said controller means and said external host.

37. The system of claim 36 wherein said external host is one of a computer and a portable media player.

38. The secure hard drive of claim 34 further comprising watermark detecting means that communicates with an output of said content playing means for determining whether said analog signal that is output by said content playing means contains a watermark.

39. The secure hard drive of claim 31 wherein said storing means stores a content directory having content directory entries for said content.

40. The secure hard drive of claim 39 wherein said public key decryption means performs digital signature verification of said content directory entry corresponding to said content that is selected for play.

41. The secure hard drive of claim 39 wherein at least one of said content directory entries contains clear content counting means for specifying a portion of said corresponding content that is not encrypted.

42. The secure hard drive of claim 39 wherein at least one of said content directory entries includes a content distributor ID field that identifies a content distributor supplying said corresponding content.

43. The secure hard drive of claim 39 wherein at least one of said content directory entries includes a content status field that has one of an active status and a passive status, wherein said active status enables playback and said inactive status disables playback.

44. The secure hard drive of claim 39 wherein at least one of said content directory entries includes a signature field for said content distributor supplying said corresponding content.

45. The secure hard drive of claim 39 wherein at least one of said content directory entries includes a content key location field that contains a first offset value that points to a content key for said selected content in a content key block stored on said storing means.

46. The secure hard drive of claim 39 wherein at least one of said content directory entries includes a content location field that contains a second offset value that points to said selected content in an encrypted content block stored on said storing means.

47. The secure hard drive of claim 31 wherein said content includes at least one of audio, video, and still pictures.

48. The system of claim 36 further comprising:

distributed means for providing a distributed communications network; and content distributor means for transmitting encrypted content, an encrypted content key, and a content directory entry for a content selection to said secure hard drive via said external host and said distributed means.

49. The secure hard drive of claim 31 wherein said storing means contains encrypted content that is pre-stored thereon.

50. A secure hard drive, comprising:

magnetic storing means that stores encrypted digital content and corresponding encrypted content keys;

a system on chip (SOC) including:

public key decryption means for receiving one of said encrypted content keys from said magnetic storage means, and for controlling decryption of said encrypted content key for said secure hard drive using a private key of said SOC to generate a content key; and block decryption means for receiving said encrypted digital content corresponding to said one of said encrypted content keys from said magnetic storing means and said content key from said public key decryption means, and for decrypting said encrypted content using said content key, wherein said public key decryption module generates said private key based on a chip identification (ID) of a secure hard drive.

51. The secure hard drive of claim 50 further comprising content playing means for receiving said decrypted digital content from said block decryption means and for generating an analog output signal.

52. The secure hard drive of claim 50 further comprising chip ID means for providing said chip ID for said SOC, wherein said private key and a public key of said SOC is based on said chip ID.

53. The secure hard drive of claim 50 wherein said SOC further includes controller means for performing buffer management and timing of read/write operations.

54. A system comprising the secure hard drive of claim 53 and further comprising:

an external host; and control interface means provides an interface between said controller means and said external host.

55. The secure hard drive of claim 51 further comprising watermark detecting means that communicates with an output of said content playing means for determining whether said analog signal that is output by said content playing means contains a watermark.

56. The secure hard drive of claim 50 wherein said magnetic storage means stores a content directory having content directory entries for said content.

57. The secure hard drive of claim 56 wherein said public key decryption means performs digital signature verification of said content directory entry corresponding to said content that is selected for play.

58. The secure hard drive of claim 56 wherein said content directory entries contain at least one of clear content counting means for specifying a portion of said corresponding content that is not encrypted, a content distributor ID field that identifies a content distributor supplying said corresponding content, a content status field that has one of an active status and a passive status, wherein said active status enables playback and said inactive status disables playback, a signature field for said content distributor supplying said corresponding content, a content key location field that contains a first offset value that points to a content key for said selected content in a content key block stored on said magnetic storing means, and a content location field that contains a second offset value that points to said selected content in an encrypted content block stored on said magnetic storing means.

59. The secure hard drive of claim 50 wherein said content includes at least one of audio, video, and still pictures.

60. The system of claim 54 further comprising:

distributed means for providing a distributed communications network; and content distributor means for transmitting encrypted content, an encrypted content key, and a content directory entry for a content selection to said secure hard drive via said external host and said distributed means.

61. A method for distributing digital content, comprising:

(a) storing encrypted digital content and corresponding encrypted content keys on a storage medium;

(b) receiving one of said encrypted content keys from said storage medium;

(c) decrypting said encrypted content key using a private key to generate a content key by a decryption module of a secure hard drive;

(d) receiving said encrypted digital content corresponding to said one of said encrypted content keys from said storage medium;

(e) decrypting said encrypted content using said content key, and (f) generating said private key based on a chip identification (ID) of the secure hard drive.

62. The method of claim 61 wherein said storage medium is a magnetic storing medium.

63. The method of claim 61 further comprising generating at least one of an analog output signal and a digital output signal based on said decrypted digital content.

64. The method of claim 61 further comprising interfacing with an external host.

65. The method of claim 63 further comprising determining whether said analog signal contains a watermark.

66. The method of claim 61 further comprising storing a content directory having content directory entries for said content on said storage medium.

67. The method of claim 66 further comprising performing digital signature verification of said content directory entry corresponding to said content that is selected for play.

68. The method of claim 66 further comprising specifying a portion of said corresponding content that is not encrypted using a clean content field in at least one of said content directory.

69. The method of claim 66 further comprising identifying a content distributor supplying said corresponding content using a content distributor ID field in at least one of said content directory entries.

70. The method of claim 66 wherein at least one of said content directory entries includes a content location field that contains a second offset value that points to said selected content in an encrypted content block stored on said storage medium.

71. The method of claim 66 wherein at least one of said content directory entries includes a signature field for said content distributor supplying said corresponding content.

72. The method of claim 66 wherein at least one of said content directory entries includes a content key location field that contains a first offset value that points to a content key for said selected content in a content key block stored on said storing means.

73. The method of claim 66 wherein at least one of said content directory entries includes a content location field that contains a second offset value that points to said selected content in an encrypted content block stored on said storing means.

74. The method of claim 61 wherein said content includes at least one of audio, video, and still pictures.

75. The method of claim 64 further comprising:
providing a distributed communications network; and
transmitting encrypted content, an encrypted content key, and a content directory entry for a content selection from at least one content distributor to said secure hard drive via said external host and said distributed communications network.

76. The method of claim 61 further comprising pre-storing encrypted content on said storage medium.

77. The method of claim 61 further comprising performing steps (b), (c), (d) and (e) using a system on chip (SOC).

78. The secure hard drive of claim 1 wherein said public key decryption module generates said private key based on said chip ID.

79. The secure hard drive of claim 78 wherein said public key decryption module generates a public key based on said private key and generates said content key based on said public key.

80. The secure hard drive of claim 1 wherein said public key decryption module generates said private key based on said chip ID.

81. The secure hard drive of claim 1 wherein said public key decryption module generates said private key based on the chip ID.

82. The secure hard drive of claim 1 wherein said private key is generated during decryption of said encrypted content key.

83. The secure hard drive of claim 1 wherein said chip ID is an ID of a system on chip of the secure hard drive.

84. The secure hard drive of claim 1 wherein said public key decryption module converts said chip ID into said private key using an algorithm including a keyed-hash function.

85. The secure hard drive of claim 1 wherein said chip ID is internally part of a chip of the secure hard drive.

86. The secure hard drive of claim 85 wherein said chip ID is not visible on an exterior of said chip.

* * * * *